March 31, 1925.
S. B. McHENRY
WIND MOTOR
Filed Nov. 20, 1922
1,531,964
2 Sheets-Sheet 1
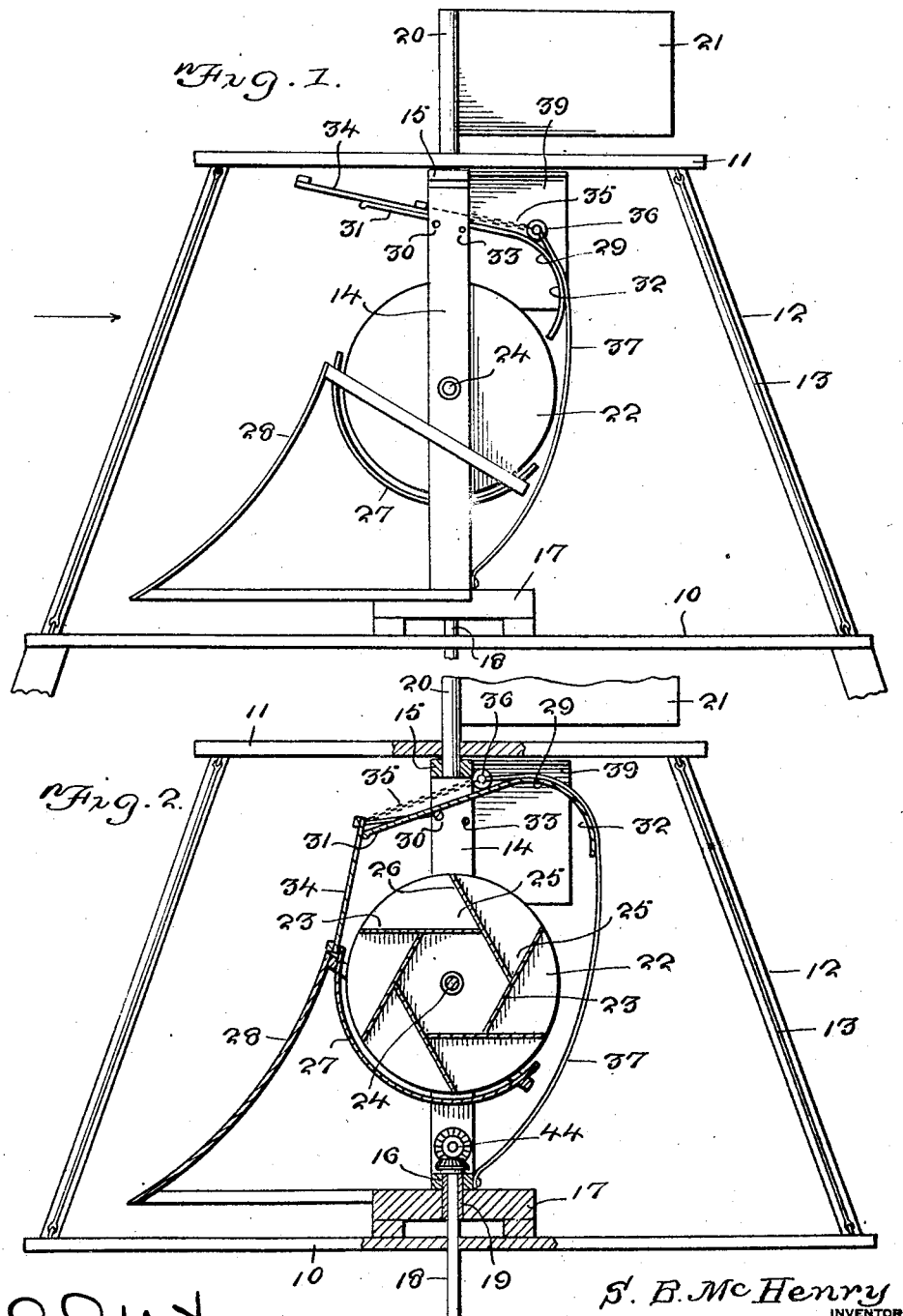

March 31, 1925.
S. B. McHENRY
WIND MOTOR
Filed Nov. 20, 1922
1,531,964
2 Sheets-Sheet 2
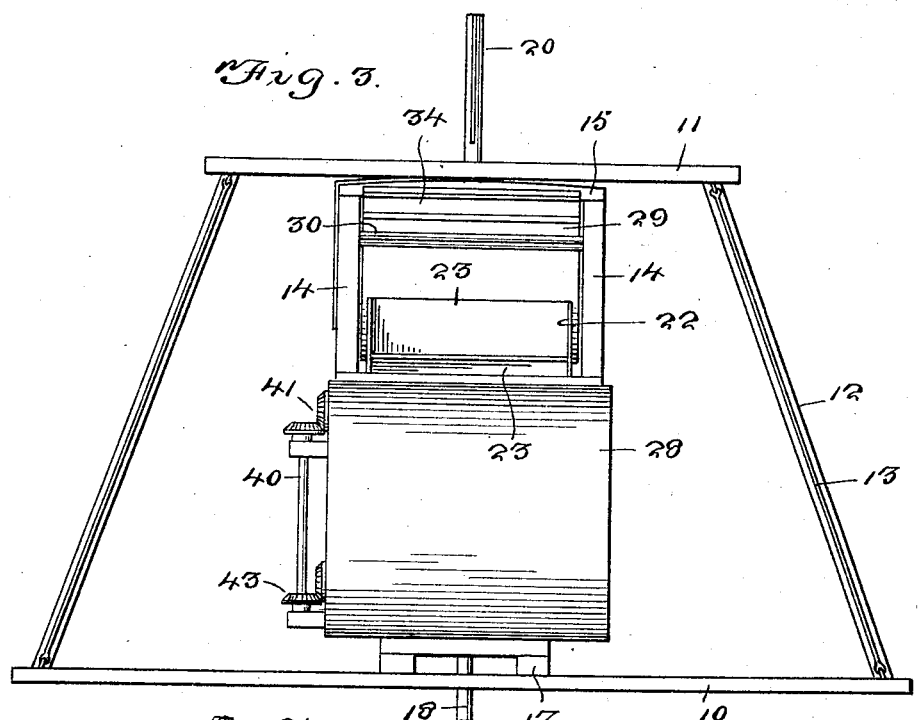
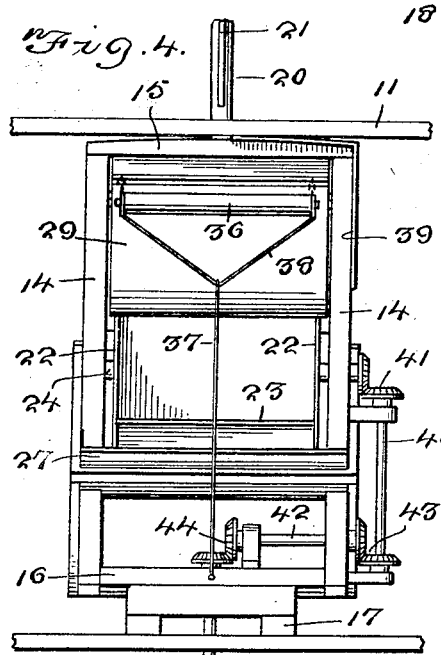
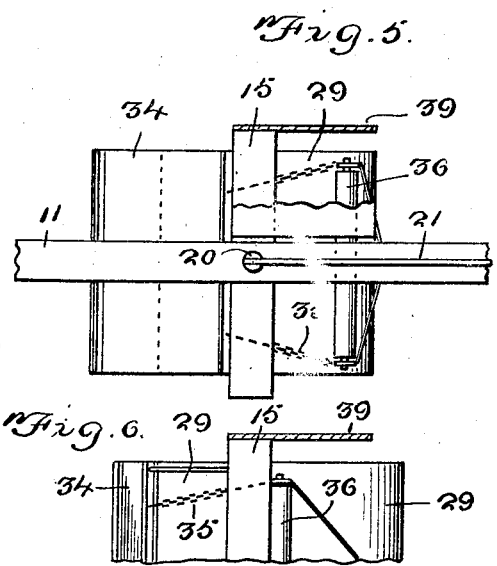

Patented Mar. 31, 1925.

1,531,964

UNITED STATES PATENT OFFICE.

SAMUEL B. McHENRY, OF BLOOMSBURG, PENNSYLVANIA.

WIND MOTOR.

Application filed November 20, 1922. Serial No. 602,163.

*To all whom it may concern:*

Be it known that I, SAMUEL B. MCHENRY, a citizen of the United States, residing at Bloomsburg, in the county of Columbia and State of Pennsylvania, have invented new and useful Improvements in Wind Motors, of which the following is a specification.

This invention relates to improvements in motors and has for an object the provision of a wind operated motor or wind mill.

Another object of the invention is the provision of a wind motor having a novel wheel or wind cylinder, which includes pockets whose walls are arranged to receive the force of the wind as soon as they pass the axial center of the wheel and to dump the wind thereafter without any dragging action, as soon as the force has been expended whereby a maximum amount of power may be obtained.

Another object of the invention is the provision of means controlled by the force of the wind for automatically governing the operation of the wind wheel, whereby, when the wind reaches a dangerous velocity, its passage to the wheel will be interrupted so that the operation will cease.

With the above and other objects in view, the invention further includes the following novel features and details of construction, to be hereinafter more fully described, illustrated in the accompanying drawings and pointed out in the appended claims.

In the drawings:

Figure 1 is a side elevation of the invention, with the parts in their normal or operative position.

Figure 2 is a similar view with parts broken away and others shown in transverse section, the position of the parts being such as to prevent operation of the wind wheel.

Figure 3 is a view similar to Figure 1 with the wheel rigid at an angle of 90 degrees with respect to the position of the wheel shown in Figure 1.

Figure 4 is a fragmentary view looking at the side opposite to that shown in Figure 3.

Figure 5 is a fragmentary plan view with parts broken away and the governing mechanism in the position shown in Figure 1.

Figure 6 is a fragmentary view with parts broken away and the governing mechanism as shown in Figure 2.

Referring in detail to the drawings, wherein like characters of reference denote corresponding parts, the motor as illustrated may be arranged upon a suitable platform, or it may be positioned upon the top of a suitable structure after the manner of the ordinary wind mill. For this purpose there is provided a base 10 and a top 11, which are connected by upwardly and inwardly inclined standards 12 and rods 13, whereby a rigid frame is provided which will not interrupt the passage of the wind therethrough.

Mounted within this frame is a second rotatable frame which includes side bars 14 and upper and lower end bars 15 and 16, the latter being arranged above the bearing step 17 through which extends a shaft 18. This shaft also extends through the lower end of the member 16 and is surrounded by a bearing sleeve 19, the latter forming a pivotal connection between the base 10 and the lower end of the bar 16 of the said second mentioned frame. The upper end of the bar 15 of this frame has extending therefrom a post 20, whose lower end is rigidly secured in the bar 15 and extends through the top of the member 11. This post 20 carries a wind vane 21, which is adapted to be acted upon by the wind to rotate and hold the frame in proper position for the operation of a wind wheel or cylinder which will now be described. This wind wheel or cylinder comprises end members 22 which are spaced apart by partitions 23 and which are mounted upon a horizontally arranged shaft 24 having bearings in the side bars 14 of the rotatable frame. The partitions 23 are arranged to provide wind pockets of novel construction and for this purpose each of these partitions is disposed tangentially with respect to the center of the wheel and the inner end of each partition contacts with the next adjacent partition at a point substantially central of the width of the latter. This provides pockets 25, whose inner ends are spaced from and disposed radially of the shaft 24 and whose walls are arranged at an acute angle, whereby the walls 26 of the pockets will provide impact members to receive the force of the wind as soon as the outer edge of the said wall passes beyond the horizontal or axial center of the wheel, while the shape of the pockets is such as to retain the force of the wind for an appreciable period and to thereafter dump the wind without any dragging action. As soon as the wind has been dumped, the pockets pass behind an arcuate member 27, which acts to close the pockets until the walls 26 pass beyond the axial center of the wheel, so that the wind will not act upon the wheel is a reverse direction. An arcuate deflector 28 is carried by the rotatable frame and extends upwardly beyond the axial center of the wheel so as to direct the wind toward a pivoted wind deflector 29.

The wind deflector 29 is pivotally mounted within the rotatable frame as shown at 30 and includes a substantially straight portion 31 and a curved portion 32, the first mentioned portion being inclined forwardly and upwardly, while the portion 32 is curved inwardly and downwardly. The portion 31 provides an entrance chute which directs the wind into the pockets 25. The deflector 29 is so pivoted that the rear or curved portion 32 will be lowered by gravity, its downward movement being limited by a stop rod 33.

In addition to the deflector 29 there is provided a plate 34 which is supported and slidable upon the deflector 29. This plate has secured to its rear edge flexible members or chains 35, which have also secured thereto a roller 36, while a cable 37 is connected to the roller 36 by means of loop or bridle 38.

Normally the parts are arranged in the position shown in Figure 1 of the drawings and wind entering the pockets 25 will rotate the wind wheel, the force of the wind being accentuated by its deflection downward from the bottom of the deflector 29 into the pockets. As the wind increases beyond a given velocity it will act upon the curved portion 32 of the deflector 29 so as to move this curved end upward and depress the end 31 so that passage of the wind to the pockets of the wheel will be interfered with. This downward movement of the end 31 of the deflector 29 will cause the plate 34 to slide downward, carrying with it the roller 36 until the said plate is arranged in the position shown in Figure 2 of the drawings so as to wholly interrupt the passage of the wind to the pockets. The force of the wind will hold the deflector 29 and plate 34 in this position until the said force has decreased sufficiently to permit of the weight of the curved end 32 of the deflector 29 to overcome the weight at the opposite edge of the deflector whereupon the said curved end will tilt downward and the weight of the roller 36 will draw the plate 34 inward upon the deflector 29 to the position shown in Figure 1 of the drawings. This operation may be manually controlled by means of the cable 37.

Located at the upper end of the rotatable frame and to one side of its axial center is an impact member which is shown as comprising an angular plate 39, which also provides a wind pocket, so that should the frame be positioned with the wind coming in a direction opposite the arrow shown in Figure 1, sufficient pressure will be exerted against the inner face of the annular impact plate to cause the frame to rotate sufficiently for the wind to act upon the vane 21, whereupon the position of the frame will be reversed so that the wind may enter the pockets 25.

The shaft 24 is connected to a horizontally arranged shaft 40 by a gearing 41 and the said shaft 40 is connected to a shaft 42 by gearing 43, while the last mentioned shaft is connected to the shaft 18 by gearing 44. Operation of the wind wheel will thus operate the shaft 18 so that power may be taken from this shaft.

The invention is susceptible of various changes in its form, proportions and minor details of construction and the right is herein reserved to make such changes as properly fall within the scope of the appended claims.

Having described the invention what is claimed is:—

1. A wind mill comprising a stationary frame, a second frame rotatably mounted therein, a horizontally rotatable cylinder mounted within said rotatable frame, means included in said cylinder to be acted upon by the wind, whereby the cylinder will be rotated, means including an impact plate of substantially right angular formation carried by the rotatable frame and located at one side of its axial center, whereby said rotatable frame will respond to the action of the wind to maintain the cylinder in operative position and normally inactive means adapted to be acted upon by the wind to interrupt the passage of the latter through the cylinder.

2. A wind mill comprising a stationary frame, a second frame rotatably mounted therein, a horizontally rotatable cylinder mounted within said rotatable frame, means included in said cylinder to be acted upon by the wind, whereby the cylinder will be rotated, a plate pivotally mounted above the cylinder and including a normally horizontally disposed inclined portion and a downwardly curved portion extending therefrom, the first mentioned portion defining a deflector for directing the wind against the curved portion and a normally inactive deflector plate controlled by the pivotally mounted plate to interrupt the passage of the wind to the cylinder.

3. A wind mill comprising a stationary frame, a second frame rotatably mounted therein, a horizontally rotatable cylinder mounted within said second rotatable frame, means included in said cylinder to be acted upon by the wind, whereby the cylinder will be rotated, means whereby the rotatable frame will respond to the action of the wind to maintain the cylinder in operative position, normally inactive means including a pivotally mounted plate and an auxiliary plate supported by and slidable upon the pivotally mounted plate and adapted to be acted upon by the wind to interrupt the passage of the latter to the cylinder.

4. A wind motor comprising a stationary frame, a second frame rotatably mounted therein, a horizontally rotatable cylinder mounted within said second frame, means included in said cylinder to be acted upon by the wind, whereby the cylinder will be rotated, means whereby the rotatable frame will respond to the action of the wind to maintain the cylinder in operative position, normally inactive means including a pivotally mounted plate, an auxiliary plate supported by and movable upon the pivotally mounted plate and adapted to be acted upon by the wind to interrupt the passage of the latter to the cylinder and gravity controlled means connected to the auxiliary plate and movable upon and controlled by the pivotally mounted plate for controlling the movement of the auxiliary plate.

In testimony whereof I affix my signature.

SAMUEL B. McHENRY.